(12) United States Patent
Kenney

(10) Patent No.: US 10,699,366 B1
(45) Date of Patent: Jun. 30, 2020

(54) TECHNIQUES FOR ALU SHARING BETWEEN THREADS

(71) Applicant: Apple Inc., Cupertino, CA (US)

(72) Inventor: Robert D. Kenney, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/057,794

(22) Filed: Aug. 7, 2018

(51) Int. Cl.
| | |
|---|---|
| *G06F 13/14* | (2006.01) |
| *G06T 1/20* | (2006.01) |
| *G06F 9/30* | (2018.01) |
| *G06F 9/38* | (2018.01) |
| G06T 15/80 | (2011.01) |
| G06T 15/00 | (2011.01) |

(52) U.S. Cl.
CPC .............. *G06T 1/20* (2013.01); *G06F 9/3001* (2013.01); *G06F 9/3867* (2013.01); *G06T 15/005* (2013.01); *G06T 15/80* (2013.01)

(58) Field of Classification Search
CPC .. G06F 9/3009; G06F 9/30123; G06F 9/3851; G06F 2209/5018
See application file for complete search history.

(56) References Cited

U.S. PATENT DOCUMENTS

| | | | |
|---|---|---|---|
| 8,009,172 B2 | 8/2011 | Jiao et al. | |
| 2009/0049276 A1 | 2/2009 | Bergland et al. | |
| 2015/0293785 A1* | 10/2015 | Murphy | ................ G06F 9/5027 718/102 |
| 2017/0024323 A1* | 1/2017 | Havlir | ................ G06F 12/0875 |
| 2017/0192481 A1 | 7/2017 | Vorbach et al. | |
| 2018/0121386 A1 | 5/2018 | Chen et al. | |

* cited by examiner

*Primary Examiner* — Hau H Nguyen
(74) *Attorney, Agent, or Firm* — Kowert, Hood, Munyon, Rankin & Goetzel, P.C.

(57) ABSTRACT

Techniques are disclosed relating to sharing an arithmetic logic unit (ALU) between multiple threads. In some embodiments, the threads also have dedicated ALUs for other types of operations. In some embodiments, arbitration circuitry is configured to receive operations to be performed by the shared arithmetic logic unit from the set of threads and issue the received operations to the shared arithmetic logic unit. In some embodiments, the arbitration circuitry is configured to switch to a different one of the set of threads for each instruction issued to the shared arithmetic logic unit. In some embodiments, the shared ALU is configured to perform 32-bit operations and the dedicated ALUs are configured to perform the same operations using 16-bit precision. In some embodiments, the shared ALU is shared between two threads and is physically located adjacent to other datapath circuitry for the two threads.

20 Claims, 7 Drawing Sheets

*500*

Perform operations for different ones of a set of multiple different threads using respective dedicated arithmetic logic units;
510

Receive operations from the set of threads to be performed by a shared arithmetic logic unit
520

Issue the received operations to the shared arithmetic logic unit, including switching to a different one of the set of threads for each instruction issued to the shared arithmetic logic unit
530

Perform operations issued by the arbitration circuitry using the shared arithmetic logic unit
540

*FIG. 5*

TECHNIQUES FOR ALU SHARING BETWEEN THREADS

BACKGROUND

Technical Field

This disclosure relates generally to computer processors and more specifically to shared arithmetic logic units.

Description of the Related Art

Graphics processing units (GPUs) are frequently used to operate on large amounts of data to generate frames of image data for display. The execution of GPU instructions may consume considerable power. GPUs are typically designed to allow a large amount of parallel execution. High power consumption may be problematic, particularly in mobile graphics applications in which a battery is used as a power source.

Different execution circuitry may perform at different rates, e.g., supporting different numbers of operations per thread per cycle. For example, floating-point arithmetic logic units (ALUs) may operate at different rates than integer ALUs. Further, ALUs that operate on operands of different precisions may operate at different rates. Further, certain types of ALUs may be used less frequently under typical workloads than other types of ALUs.

BRIEF DESCRIPTION OF THE DRAWINGS

FIG. 5 is a flow diagram illustrating an exemplary method for using mixed-rate ALUs when sharing one or more ALUs, according to some embodiments.

Figure 1A:
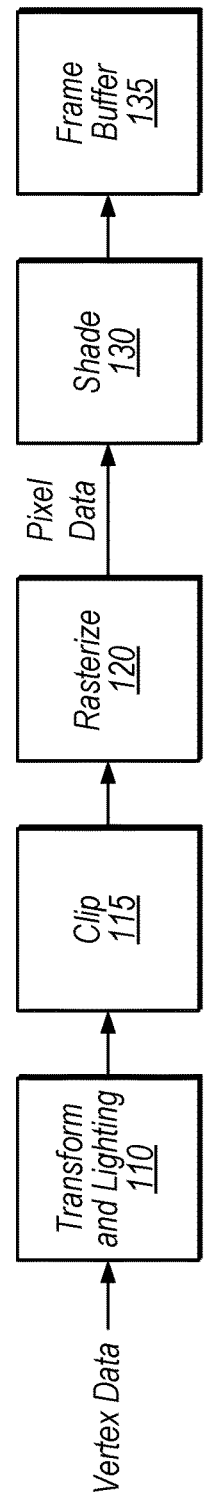
FIG. 1A is a block diagram illustrating an exemplary graphics processing flow.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Figure 1B:
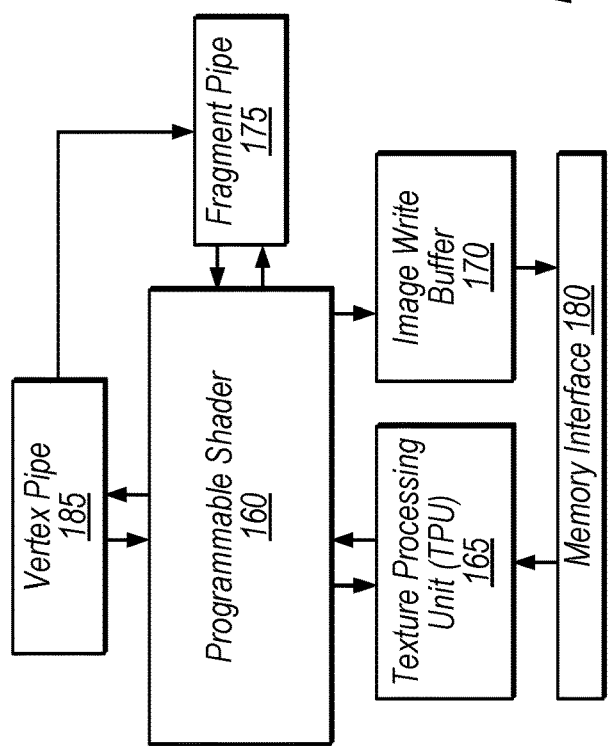
FIG. 1B is a block diagram illustrating one embodiment of a graphics unit.
Figure 2:
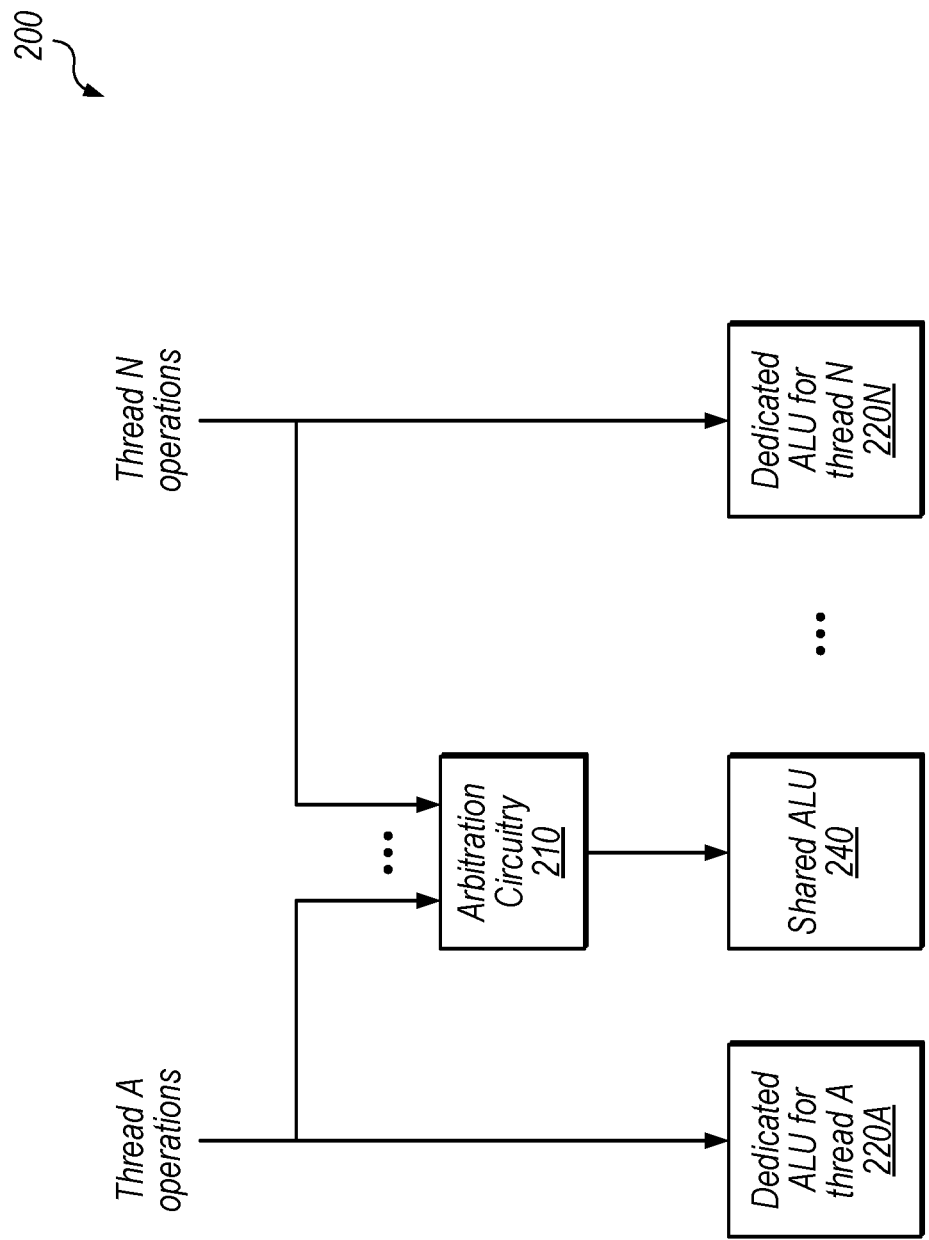
FIG. 2 is a block diagram illustrating circuitry with dedicated and shared ALUs and arbitration circuitry for the shared ALU, according to some embodiments.
Figure 3:
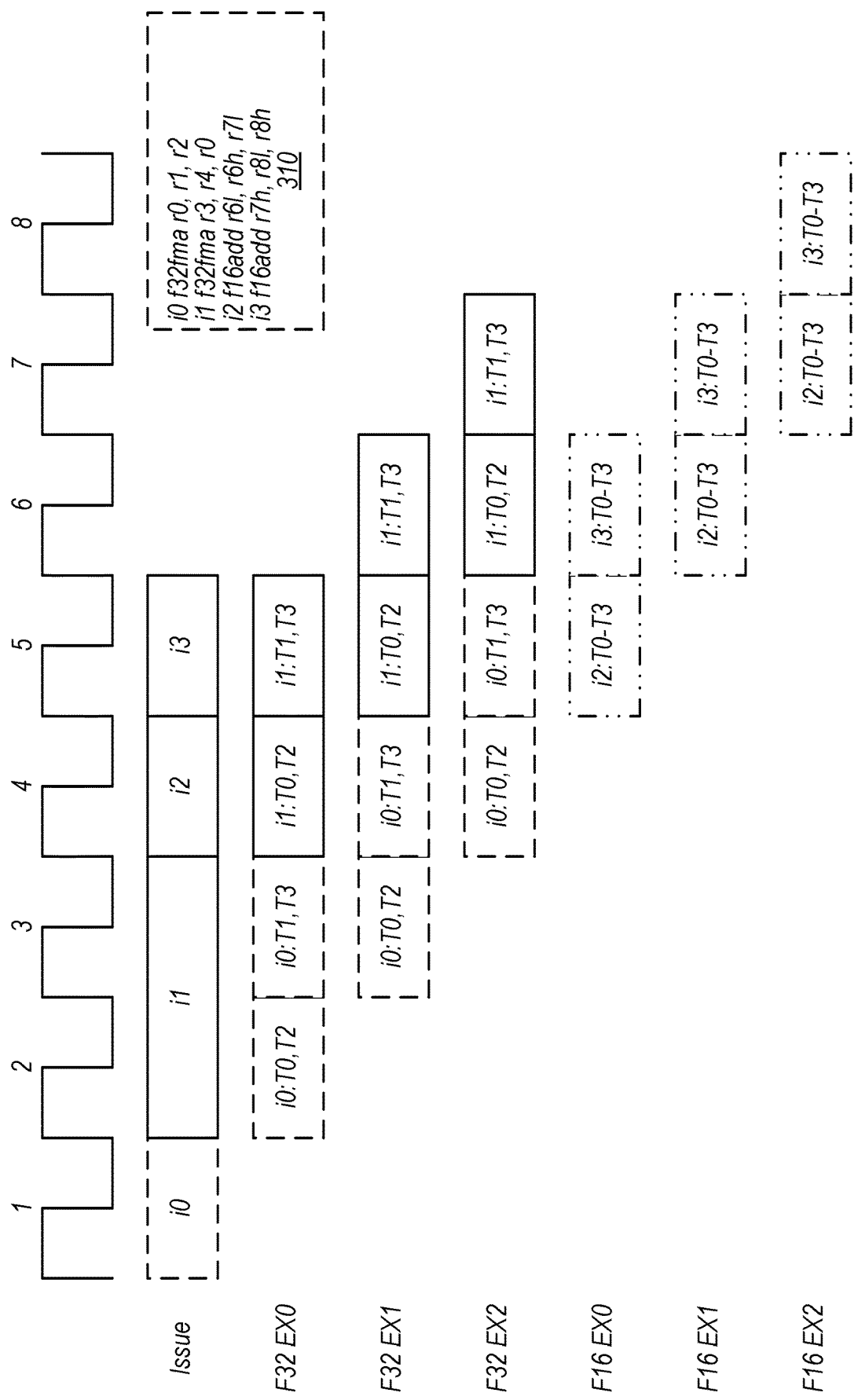
FIG. 3 is a diagram illustrating exemplary execution of instructions that use different types of ALUs, according to some embodiments.
Figure 4:
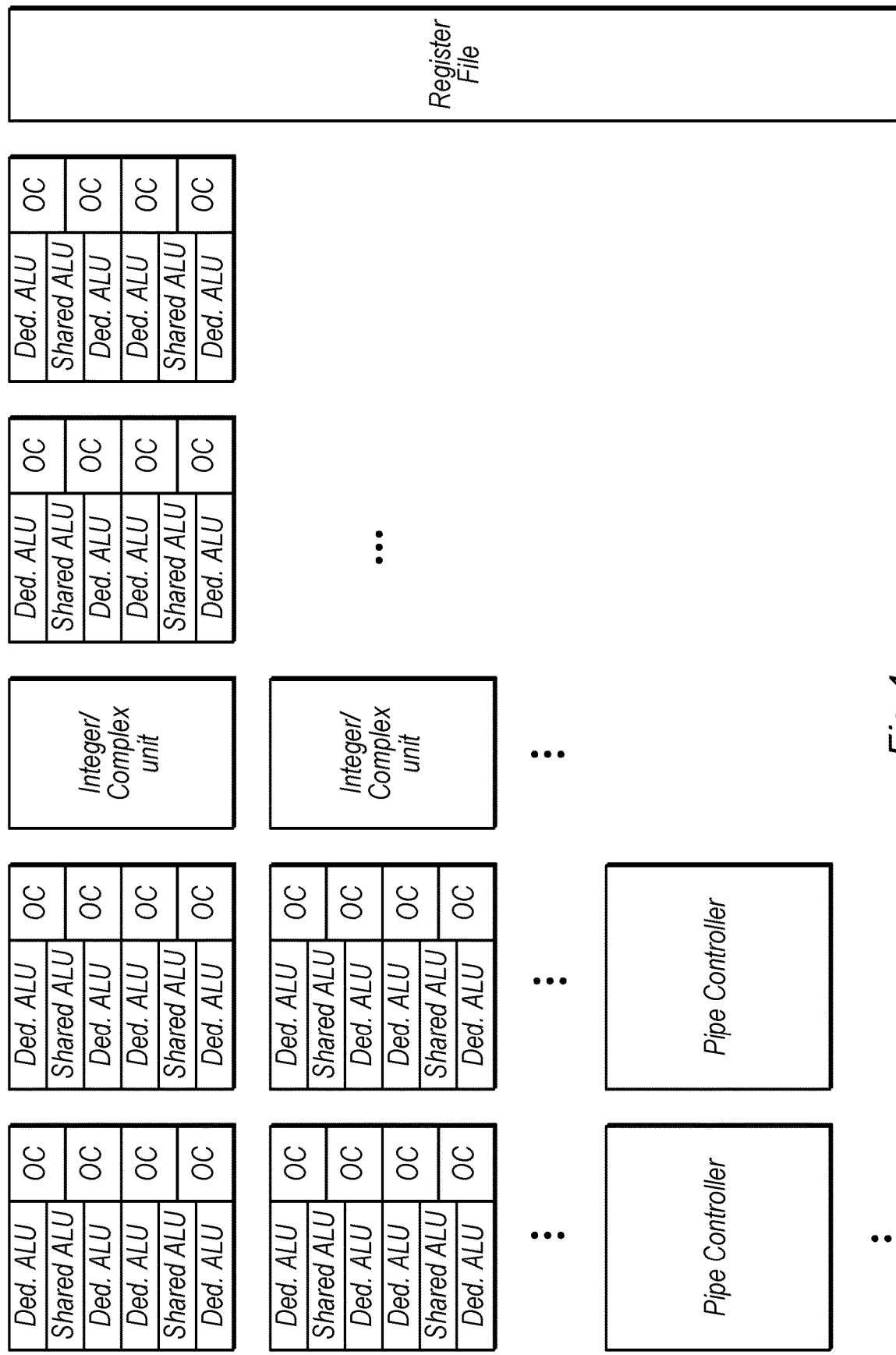
FIG. 4 is diagram illustrating exemplary layout of ALUs and operand caches, according to some embodiments.
Figure 6:
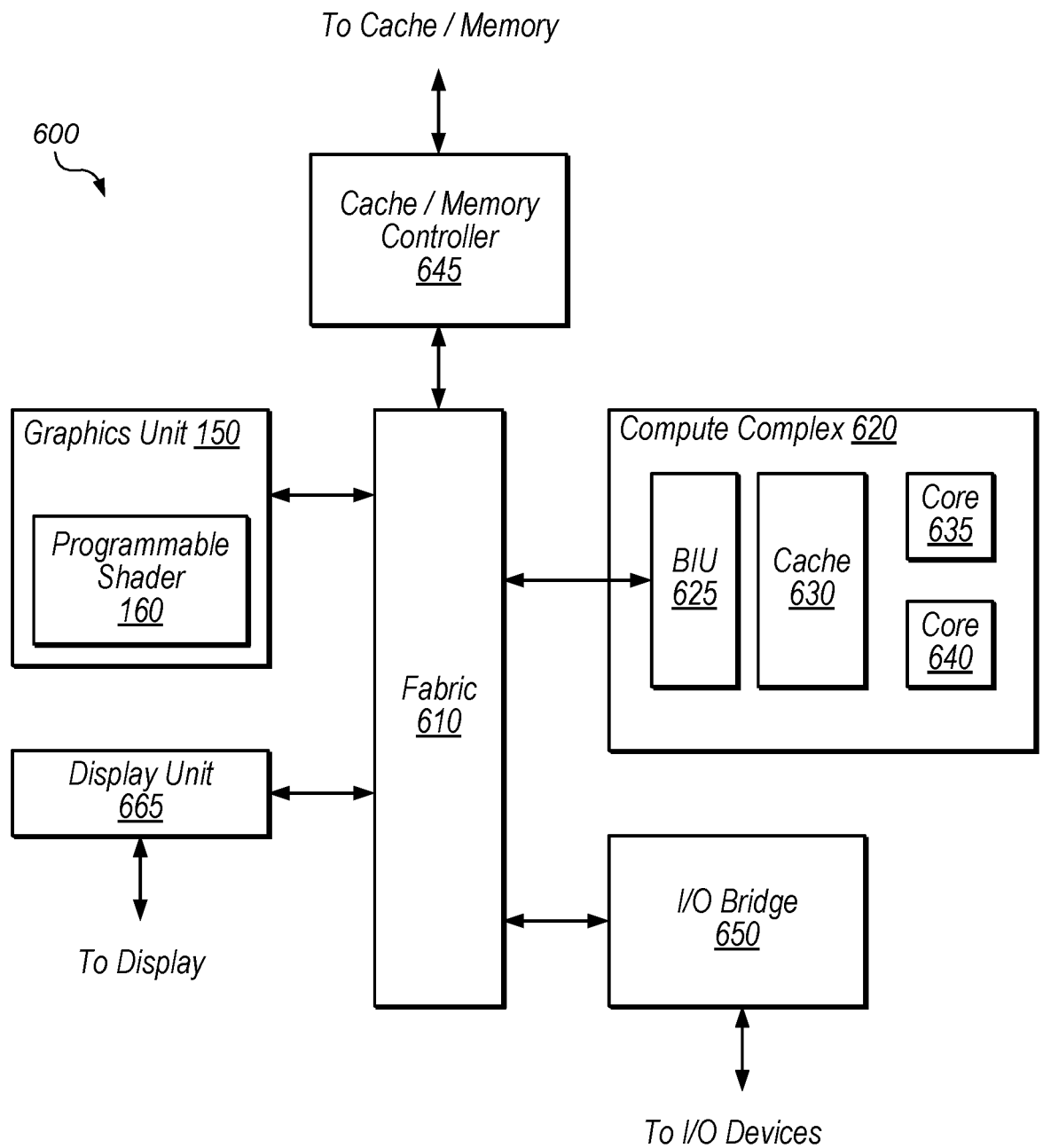
FIG. 6 is a block diagram illustrating one embodiment of a device that includes a graphics unit.
Figure 7:
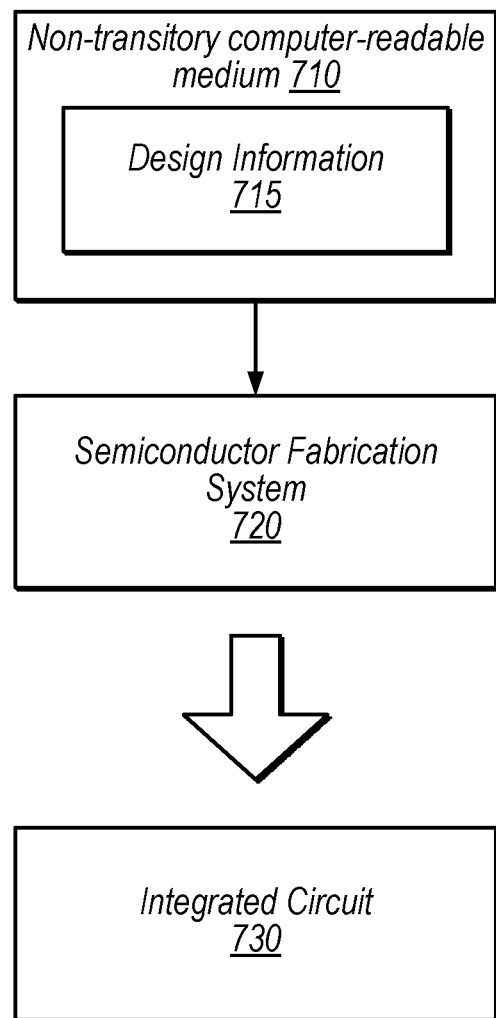
FIG. 7 is a block diagram illustrating an exemplary computer-readable medium, according to some embodiments.

This disclosure initially describes, with reference to FIGS. 1A-1B, a generalized overview of a graphics processing flow and an exemplary graphics unit. FIG. 2 illustrates exemplary ALU sharing, FIG. 3 illustrates exemplary execution stages using shared ALUs, and FIG. 4 shows an exemplary layout with shared ALUs physically near or adjacent to circuitry processing threads that share the ALUs. FIG. 5 illustrates an exemplary method, FIG. 6 illustrates an exemplary device, and FIG. 7 illustrates an exemplary computer-readable medium. In various embodiments, the disclosed techniques may provide improved performance, reduced chip area, and/or reduced power consumption relative to traditional approaches.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Exemplary ALU Sharing

FIG. 2 is a block diagram illustrating exemplary circuitry that includes dedicated and shared ALUs, according to some embodiments. In the illustrated embodiment, circuitry 200 includes arbitration circuitry 210, dedicated ALUs 220 A-N for a number of threads A-N, and shared ALU 240.

In various embodiments, various different numbers of threads may share one or more ALUs for certain types of operations while also using respective dedicated ALUs for other types of operations. For example, shared ALU 240 may be shared by 2, 3, 4, 16, or any other appropriate number of threads. As used herein, the term "arithmetic logic unit" (ALU) is intended to be construed according to its well-understood meaning, which includes electronic circuitry configured to perform arithmetic and/or bitwise operations on input operands. The term ALU is thus intended to cover both integer units that operate on integer representations of input values and floating-point units that operate on floating-point representations of input values. An ALU is one example of an "execution unit," but note that there are other non-ALU examples of execution units such as load/store units that typically do not perform arithmetic or bitwise operations. Different ALUs in the same device may be configured to perform different sets of operations.

Arbitration circuitry 210, in the illustrated embodiment, is configured to select operations from among threads A-N to issue for execution by shared ALU 240. Shared ALU 240, in the illustrated embodiment, is therefore configured to perform operations for multiple threads. In some embodiments, arbitration circuitry 210 is configured to issue one operation per cycle to shared ALU 240 in situations where operations are available. As used herein, the term "thread" is intended to be construed according to its well-understood meaning in the art which includes a sequence of program instructions that can be scheduled for execution independently of other threads. Multiple threads may be included in a task or process (which may correspond to a computer program). Threads of a given task may or may not share resources such as registers and memory. In some embodiments, certain resources are dedicated to a thread currently assigned to those resources and certain resources are shared among one or more threads.

Dedicated ALUs 220, in the illustrated embodiments, are configured to perform operations only for the thread currently assigned to that ALU. In some embodiments, graphics unit 150 is configured to perform sets of operations corresponding to dedicated ALUs 220 and shared ALU 240 operate at different rates. For example, graphics unit 150 may perform operations using shared ALU 240 at a slower rate than the dedicated ALUs 220 (e.g., because multiple threads take turns using the shared ALU 240). In some embodiments, dedicated ALUs 220 are configured to perform 16-bit floating point operations and certain 32-bit integer operations and shared ALU 240 is configured to perform 32-bit floating-point operations. In these embodiments, ALU 240 may operate at half the rate of ALUs 220, in terms of operations per thread per clock cycle. In some embodiments, multiple shared ALUs for the same set of threads may operate at multiple different rates, e.g., another shared ALU may operate at half the rate of shared ALU 240.

In some embodiments, shared ALU 240 has an exposed latency of N cycles, where N is an integer greater than zero. For example, a common exposed latency is two cycles. With a two-cycle exposed latency, an operation immediately forwarding its result to the next instruction of the program will result in a one cycle stall. This stall may be avoided by scheduling non-dependent instructions in that window (e.g., by the compiler) to achieve full pipeline utilization, but this may not always be feasible for some programs.

Therefore, in some embodiments, shared ALU 240 performed operations for a set of pipelines for neighboring threads and arbitration circuitry 210 is configured to sequence threads such that threads are staggered. In some embodiments, this may avoid a need to stall between dependent instructions of the same thread. For example, in some embodiments in which shared ALU 240 is shared between only two threads, arbitration circuitry 210 is configured to send an operation from a first thread, then a second thread, then the first thread, and so on. In some embodiments, larger numbers of threads may be staggered, e.g., three threads, four threads, etc. that share an ALU. Restricting sharing of ALUs to a relatively small number of threads may, however, reduce timing and routing constraints by allowing other thread processing circuitry to be located near the shared ALUs.

In some embodiments, the disclosed staggering may advantageously hide the exposed latency and achieve full pipeline utilization. For example, when a thread executes a first instruction followed immediately by a second instruction that depends on the first instruction, the second instruction may not need to stall, e.g., because another instruction from another staggered thread was issued between the first and second instructions. In some embodiments, this may allow the compiler flexibility to schedule back-to-back operations that use the shared ALU for a given thread (e.g., when register pressure is high) while interleaving instructions to the shared ALU and non-shared ALU(s) in other situations. In some embodiments, the staggering may also reduce timing pressure for threads to get information into and out of the shared ALU.

Although various examples herein include two types of ALUs that operate at different rates, additional rates may be utilized in the same device, in various embodiments. As one non-limiting example, a device may include full-rate, half-rate, and quarter rate ALUs, one or more types of which may be shared. Speaking generally, the rate capabilities of ALUs may be due to characteristics of the ALUs and/or the number of ALUs implemented. Speaking generally, any of various combinations of factors may cause a device to be capable of performing different types of ALU operations at different rates.

Exemplary Thread Execution Using Both Dedicated and Shared ALUs

FIG. 3 is a timing diagram illustrating exemplary execution of a set of instructions 310 (shown in the upper right hand portion of FIG. 3 in the dashed box) for a quad of pixels, according to some embodiments. Note that a 2×2 quads of pixels are commonly handled in parallel by pixel shaders. In various embodiments, groups of threads may execute the same instructions using single-instruction multiple-data (SIMD) techniques at various granularities. In the illustrated embodiment, instructions 310 includes four instructions i0 through i3. I0 and i1 in the illustrated embodiment, are 32-bit fused multiply add instructions while i2 and i3 are 16-bit add instructions. In the illustrated example, instructions i0 and i1 are executed using a pair of shared ALUs and instructions i2 and i3 are executed using dedicated ALUs. In the illustrated example, execution of each instruction is shown for four threads in the quad: T0 through T3. In the illustrated example, threads T0 and T1 share one 32-bit ALU and threads T2 and T3 share another 32-bit ALU.

In the illustrated example, both the 16-bit and 32-bit operations use three execution cycles EX0 through EX2. Note, however, that various different types of instructions may use larger or smaller numbers of execution cycles. In the illustrated embodiment, the 32-bit operations are performed at half the rate of the 16-bit ALUs because they are performed on half the number of threads per cycle (two threads per cycle for 32-bit operations using two shared 32-bit ALUs as opposed to four threads per cycle for 16-bit operations using four dedicated 16-bit ALUs). In cycle 1, in the illustrated example, instruction i0 issues to the execution unit.

In cycle 2, in the illustrated example, instruction i1 reaches an issue stage and stage EX0 of two 32-bit shared ALUs processes instruction i0 for threads T0 and T2.

In cycle 3, in the illustrated example, instruction i1 issues. In the illustrated example, stage EX0 of the two shared ALUs processes instruction i0 for threads T1 and T3 while stage EX1 of the shared ALUs processes instruction i0 for threads T0 and T2.

In cycle 4, in the illustrated example, instruction i2 issues. In the illustrated example, stage EX0 of the two shared ALUs processes instruction i1 for threads T0 and T2, stage EX1 of the shared ALUs processes instruction i0 for threads T1 and T3, and stage EX2 of the shared ALUs processes instruction i1 for threads T0 and T2.

In cycle 5, in the illustrated example, instruction i3 issues. In the illustrated example, stage EX0 of the two shared ALUs processes instruction i1 for threads T1 and T3, stage EX1 of the shared ALUs processes instruction i1 for threads T0 and T2, and stage EX2 of the shared ALUs processes instruction i0 for threads T1 and T3. In the illustrated example, stage EX0 of four dedicated ALUs processes instruction i2.

In the illustrated example, execution proceeds until all of instructions 310 have completed execution at the end of cycle 8. Note that, in the illustrated example, exposed latency may be hidden because of the staggering between threads T0 and T1 on one shared ALU and between threads T2 and T3 on the other shared ALU. In the illustrated example, instruction i1 depends on results from instruction i0. Because of the staggering, i0 completes execution for a given thread when the thread is in the EX0 stage for i1. For example, i0 completes for T1 in the EX2 stage at cycle 5 while i1:T1 is in the EX0 stage. In some embodiments, this is sufficient to forward the result data from i0:T1 for use by i1:T1 without stalling.

Exemplary ALU Layout

FIG. 4 is a layout diagram illustrating exemplary physical positioning of circuitry that implements ALUs, operand caches (OCs), and other processing elements, according to some embodiments. In the illustrated embodiment, the datapath processing elements includes multiple dedicated ALUs, multiple shared ALUs, multiple pipe controllers, multiple operand caches, and a register file.

In the illustrated embodiment, vertical portions of the illustrated circuitry are controlled by a pipe controller (which may be referred to as a virtual pipe controller). In some embodiments, each pipe controller controls all or a portion of a clique, warp, or wavefront, which are examples of groups of threads that share control signaling. Each horizontal row of the illustrated circuitry may be referred to as a data path quad. In the illustrated embodiment, each data path quad is configured to share an integer/complex unit, which is another ALU that operates at one fourth the rate of the dedicated ALUs, in some embodiments. In some embodiments, the register file stores operands for processing by various ALUs. In some embodiments, the operand caches are configured to cache operands fetched from the register file and/or generated by the ALUs, e.g., for potential re-use by an ALU. The use of operand caches may improve performance and/or reduce power consumption relative to simply accessing operands in the register file, in some embodiments.

In the illustrated embodiment, an operand cache is assigned to each thread. In the illustrated embodiment, the shared ALUs are shared by two threads while the dedicated ALUs are dedicated to a single thread. As one example, the shared ALUs may be 32-bit ALUs and the dedicated ALUs may be 16-bit ALUs. In other embodiments, any of various appropriate numbers of threads may share one or more shared ALUs. As one specific example, one of the illustrated sets of four OCs, four dedicated ALUs, and two shared ALUs may be configured to perform the example operations discussed above with reference to FIG. 3.

As shown, in some embodiments, shared ALUs are placed in physical proximity (e.g., adjacent to) to other circuitry configured to process corresponding threads. In the illustrated example, each shared ALU is physically located near the dedicated ALUs and operand caches for the corresponding two threads. In some embodiments, this physical proximity may simplify routing and reduce timing pressure in sourcing operands for the shared ALUs.

Exemplary Method

FIG. 5 is a flow diagram illustrating an exemplary method 500 for executing instructions of threads that share an ALU, according to some embodiments. The method shown in FIG. 5 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 510, in the illustrated embodiment, a computing device (e.g., graphics unit 150) performs operations for different ones of a set of multiple different threads using respective dedicated arithmetic logic units (e.g., ALUs 220A-220N).

At 520, in the illustrated embodiment, arbitration circuitry of the computing devices receives operations from the set of threads to be performed by a shared arithmetic logic unit (e.g., ALU 240). In some embodiments, the shared arithmetic logic unit forwards a result from a first operation from a given thread for use as an input for a dependent operation from the given thread, where the forwarded result is available to the dependent operation after a delay of one or more cycles subsequent to completion of the first operation. This may correspond to the exposed latency of the shared ALU.

At 530, in the illustrated embodiment, the arbitration circuitry issues the received operations to the shared arithmetic logic unit. In the illustrated embodiment, this includes switching to a different one of the set of threads for each instruction issued to the shared arithmetic logic unit. For example, for two threads that share the ALU, the arbitration circuitry may issue an instruction from thread 1, thread 2, thread 1, thread 2, and so on. For embodiments in which larger numbers of threads share the ALU, the arbitration circuitry may issue instructions in a round-robin fashion or according to some other rule (e.g., for four threads, the arbitration circuitry may switch between threads 1 and 2 until those two threads are finished and then switch between threads 3 and 4).

At 540, in the illustrated embodiment, the shared arithmetic logic unit performs operations issued by the arbitration circuitry. Note that performing the operations may take different numbers of clock cycles depending on the different types of operations being performed, e.g., as indicated by their opcodes.

Exemplary Device

Referring now to FIG. 6, a block diagram illustrating an exemplary embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 150, and display unit 665. In some embodiments, device 600 may include other components (not shown) in addition to and/or in place of the illustrated components, such as video processor encoders and decoders, image processing or recognition elements, computer vision elements, etc.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in device 600 may be configured to maintain coherency between various caches of device 600.

BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 150 may be described as "coupled to" a memory through fabric 610 and cache/memory controller 645. In contrast, in the illustrated embodiment of FIG. 6, graphics unit 150 is "directly coupled" to fabric 610 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In some embodiments, graphics unit 150 is configured to perform one or more of the memory consistency, mid-render compute, local image block, and/or pixel resource synchronization techniques discussed above.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 650.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 7 is a block diagram illustrating an exemplary non-transitory computer-readable storage medium that stores circuit design information, according to some embodiments. In the illustrated embodiment semiconductor fabrication system 720 is configured to process the design information 715 stored on non-transitory computer-readable medium 710 and fabricate integrated circuit 730 based on the design information 715.

Non-transitory computer-readable storage medium 710, may comprise any of various appropriate types of memory devices or storage devices. Non-transitory computer-readable storage medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 710 may include other types of non-transitory memory as well or combinations thereof. Non-transitory computer-readable storage medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabrication at least a portion of integrated circuit 730. The format of design information 715 may be recognized by at least one semiconductor fabrication system 720. In some embodiments, design information 715 may also include one or more cell libraries which specify the synthesis and/or layout of integrated circuit 730. In some embodiments, the design information is specified in whole or in part in the form of a netlist that specifies cell library elements and their connectivity. Design information 715, taken alone, may or may not include sufficient information for fabrication of a corresponding integrated circuit. For example, design information 715 may specify the circuit elements to be fabricated but not their physical layout. In this case, design information 715 may need to be combined with layout information to actually fabricate the specified circuitry.

Integrated circuit 730 may, in various embodiments, include one or more custom macrocells, such as memories, analog or mixed-signal circuits, and the like. In such cases, design information 715 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown in FIGS. 1B, 2, and/or 4. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a shared arithmetic logic unit that is shared for performing operations specified by a set of multiple different threads, wherein the shared arithmetic logic unit is configured to forward a result from a first operation from a given thread for use as an input for a dependent operation from the given thread, wherein the forwarded result is available to the dependent operation after a delay of one or more cycles subsequent to completion of the first operation;
    a set of arithmetic logic units each configured to perform only operations specified by a thread of the set of threads that is currently assigned to the arithmetic logic unit and not operations from other threads, wherein the arithmetic logic unit is configured to accept an operation to be performed from the assigned thread each clock cycle; and
    arbitration circuitry configured to:
        receive operations to be performed by the shared arithmetic logic unit from the set of threads; and
        issue the received operations to the shared arithmetic logic unit, including, in one or more modes of operation, switching to a different one of the set of threads for each instruction issued to the shared arithmetic logic unit.

2. The apparatus of claim 1, wherein the apparatus is configured to perform a smaller number of operations per thread per clock cycle for operations performed by the shared arithmetic logic unit than for operations performed by the set of arithmetic logic units.

3. The apparatus of claim 1, wherein the shared arithmetic logic unit is configured to forward a result from an operation that uses the shared arithmetic logic unit to an immediately subsequent dependent operation from the same thread without stalling.

4. The apparatus of claim 1, wherein datapath processing elements corresponding to the multiple different threads are physically located adjacent to the shared arithmetic logic unit.

5. The apparatus of claim 4, wherein the datapath processing elements include the set of arithmetic logic units and dedicated operand caches for ones of the multiple different threads.

6. The apparatus of claim 1, wherein two threads share the shared arithmetic logic unit and the arbitration circuitry is configured to switch between the two threads each time it issues an operation to the shared arithmetic logic unit.

7. The apparatus of claim 1, wherein the set of threads also shares another arithmetic logic unit that is configured to perform a different set of operations than the shared arithmetic logic unit.

8. The apparatus of claim 1, wherein the apparatus is a graphics processing unit (GPU) and wherein the set of multiple different threads execute at least a portion of the same instructions using different data and are controlled using one or more shared control signals.

9. The apparatus of claim 1, wherein the set of arithmetic logic units are configured to perform a set of operations with input operands of a first precision and the shared arithmetic logic unit is configured to perform one or more of the same set of operations with input operands of a second, greater precision.

10. A method, comprising:
    performing, by a computing device, operations for different ones of a set of multiple different threads using respective arithmetic logic units that are each configured to perform only operations for a thread that is currently assigned to the arithmetic logic unit and not operations from other threads;
    receiving, by arbitration circuitry of the computing device, operations from the set of threads to be performed by a shared arithmetic logic unit, wherein the shared arithmetic logic unit forwards a result from a first operation from a given thread for use as an input for a dependent operation from the given thread, wherein the forwarded result is available to the dependent operation after a delay of one or more cycles subsequent to completion of the first operation;
    issuing, by the arbitration circuitry, the received operations to the shared arithmetic logic unit, including switching to a different one of the set of threads for each instruction issued to the shared arithmetic logic unit; and
    performing, by the shared arithmetic logic unit, operations issued by the arbitration circuitry.

11. The method of claim 10, further comprising:
    forwarding, by the shared arithmetic logic unit, a result from an operation that uses the shared arithmetic logic unit to an immediately subsequent dependent operation from the same thread without stalling.

12. The method of claim 10, wherein the set of threads consists of two threads and the arbitration circuitry switches between the two threads each time it issues an operation to the shared arithmetic logic unit.

13. The method of claim 10, further comprising:
receiving, by arbitration circuitry of the computing device, operations from the set of threads to be performed by second shared arithmetic logic unit that is configured to perform a different set of operations than the shared arithmetic logic unit; and
issuing, by the arbitration circuitry, the received operations to the second shared arithmetic logic unit, including switching to a different one of the set of threads for each instruction issued to the second shared arithmetic logic unit.

14. The method of claim 10, wherein the set of multiple different threads execute at least a portion of the same instructions using different data and are controlled using one or more shared control signals.

15. A non-transitory computer readable storage medium having stored thereon design information that specifies a design of at least a portion of a hardware integrated circuit in a format recognized by a semiconductor fabrication system that is configured to use the design information to produce the circuit according to the design, including:
a shared arithmetic logic unit that is shared for performing operations specified by a set of multiple different threads, wherein the shared arithmetic logic unit is configured to forward a result from a first operation from a given thread for use as an input for a dependent operation from the given thread, wherein the forwarded result is available to the dependent operation after a delay of one or more cycles subsequent to completion of the first operation;
a set of arithmetic logic units each configured to perform only operations specified by a thread of the set of threads that is currently assigned to the arithmetic logic unit and not operations from other threads, wherein the arithmetic logic unit is configured to accept an operation to be performed from the assigned thread each clock cycle; and
arbitration circuitry configured to:
receive operations to be performed by the shared arithmetic logic unit from the set of threads; and
issue the received operations to the shared arithmetic logic unit, including, in one or more modes of operation, switching to a different one of the set of threads for each instruction issued to the shared arithmetic logic unit.

16. The non-transitory computer readable storage medium of claim 15, wherein the circuit is configured to perform a smaller number of operations per thread per clock cycle for operations performed by the shared arithmetic logic unit than for operations performed by the set of arithmetic logic units.

17. The non-transitory computer readable storage medium of claim 15, wherein the shared arithmetic logic unit is configured to forward a result from an operation that uses the shared arithmetic logic unit to an immediately subsequent dependent operation from the same thread without stalling.

18. The non-transitory computer readable storage medium of claim 15, wherein the design information specifies that datapath processing elements corresponding to the multiple different threads are physically located adjacent to the shared arithmetic logic unit.

19. The non-transitory computer readable storage medium of claim 15, wherein the set of threads also shares another arithmetic logic unit that is configured to perform a different set of operations than the shared arithmetic logic unit.

20. The non-transitory computer readable storage medium of claim 15, wherein the circuit is a graphics processing unit (GPU) and wherein the set of multiple different threads execute at least a portion of the same instructions using different data and are controlled using one or more shared control signals.

* * * * *